H. Bock,
Glass Press.
Nº 46,330. Patented Feb. 14, 1865.
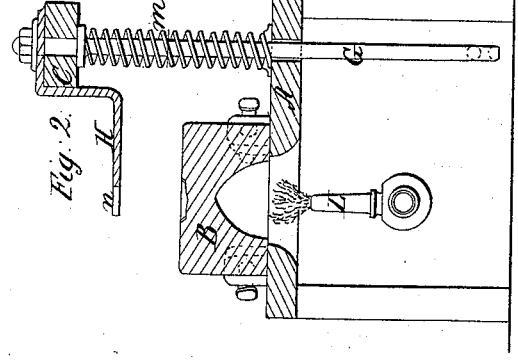
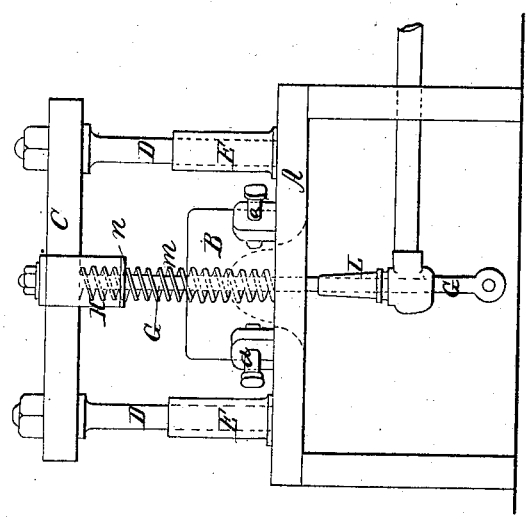
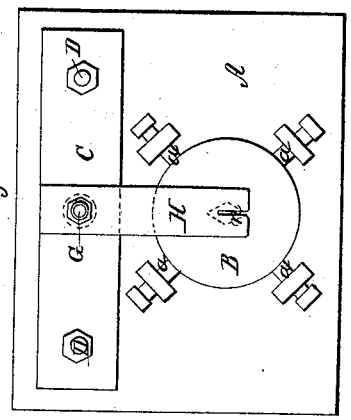
Witnesses:
Inventor:
Henry Bock

UNITED STATES PATENT OFFICE.

HENRY BOCK, OF NEW YORK, N. Y.

MACHINE FOR MAKING BUTTONS.

Specification forming part of Letters Patent No. 46,330, dated February 14, 1865.

*To all whom it may concern:*

Be it known that I, HENRY BOCK, of New York, in the county and State of New York, have invented a new and Improved Machine for making Glass Buttons; and I do hereby declare that the following is a full and exact description thereof, reference being had to the accompanying drawings, and to the letters of reference marked thereon.

Figure I represents a front view, Fig. II is a cross section, and Fig. III is a plan, of my improved machine.

Glass buttons at present are made by melting the glass under the blow-pipe upon the metal eye of the button, and, when a sufficient quantity of glass has been put on, to press the same into a die having the desired shape of the button, to give the glass the required form or shape. By this manner of operation a very great difficulty is experienced when the buttons are required to have sharp corners, and it is almost impossible to make square or triangular-shaped buttons with sharp corners and edges, as the glass is only pressed into the die by hand by means of the pinchers which grip the eye.

My improvement consists in the arrangement of a plate or presser-bar above the die-block, and which acts upon the back of the button while the glass is pressed into the countersunk die, whereby the melted glass is forced into the corners of the die to produce sharp edges and corners on the face of the button.

In the accompanying drawings, A is a plate, to which the die-block B is attached by means of screws $a$ $a$, or any other suitable arrangement. C is a cross-bar guided by means of the rods D D, moving in the sockets E E, fast to the plate A, or by any other suitable guides while moving upward or downward. To the middle of the bar C a rod, G, is attached, passing through the plate A, as well as through the table to which the machine may be fixed. To the bottom of this rod a cord or strap is fastened, connected to the foot of the operator, by means of which the cross-bar is moved downward. Around the upper end of the rod G a spiral spring, $m$, is placed between the cross-bar C and the plate A, to force the cross-bar C upward when released from the action of the foot. To this cross-bar C the plate or presser-bar H is firmly attached, projecting over the die-block B. In the end of this presser-bar a slot, $n$, is made to receive the eye of the button. To prevent the sudden cooling of the glass while being pressed into the form or die, a gas-flame, L, is arranged under the die-block B, to keep the same hot.

The operation of making glass buttons with this machine is as follows: After a sufficient quantity of glass has been attached or melted upon the metal eye of the button, in the usual manner, the eye is passed into the slot $n$ at the end of the presser-bar H, so that the heated glass will come between the presser-bar H and the die-block B. The bar C, together with the presser-bar attached, is then suddenly forced downward by the action of the operator's foot on the end of the strap attached to the rod G, by which operation the heated glass to form the button is forced into the countersunk die, and pressed, through the action of the presser-bar H, so as to force the glass into the corners of the die, and insures thereby a perfect and sharp-cornered button, corresponding to the shape and form of the die. The strap is then relieved from the action of the foot, when the spring $m$ will force the cross-bar C, as well as the presser-bar H, upward, when the button is taken out of the slot and the machine is ready for the next operation.

What I claim as my invention, and desire to secure by Letters Patent, is—

The arrangement and combination of a presser bar or plate, H, above the die-block, provided with a slot, $n$, to receive the eye of the button, and operating in the manner and for the purpose substantially as described and set forth.

HENRY BOCK.

Witnesses:
HENRY E. ROEDER,
S. S. MERRIAM.